United States Patent [19]
Atkinson

[11] 4,243,173
[45] Jan. 6, 1981

[54] PNEUMATIC OPTIMIZER

[75] Inventor: Gaylen V. Atkinson, Salt Lake City, Utah

[73] Assignee: Mark Controls Corporation, Evanston, Ill.

[21] Appl. No.: 34,648

[22] Filed: Apr. 30, 1979

[51] Int. Cl.³ .............................................. F23N 5/20
[52] U.S. Cl. ................................... 236/46 R; 236/84; 236/91 R
[58] Field of Search ............... 236/46 R, 91 R, 91 D, 236/84; 165/12

[56] References Cited

U.S. PATENT DOCUMENTS

| 3,979,059 | 9/1976 | Davis | 236/46 R |
| 4,186,874 | 2/1980 | Jensen | 236/46 R |

FOREIGN PATENT DOCUMENTS 2617154  11/1976  Fed. Rep. of Germany ........ 236/46 R Primary Examiner—William E. Wayner
Attorney, Agent, or Firm—Hume, Clement, Brinks, Willian & Olds, Ltd.

[57] ABSTRACT

A system for controlling the starting time of a thermal conditioning system for air in an enclosed space includes a pneumatic temperature transmitter, a pressure chamber, bleed device, and a valve for selectively providing communications either between the temperature transmitter and the pressure chamber (first position) or the pressure chamber and bleed device (second position). When a timing device is turned off at a predetermined time the valve is actuated into the first position. The pressure in the pressure chamber then rises and actuates a switch to shut off the thermal conditioning system. The pneumatic temperature transmitter then senses a temperature which is indicative of the amount of thermal conditioning necessary to bring the temperature of the air in the enclosed space to a desired level by a predetermined time and generates in response thereto an air pressure signal. The air pressure signal is continuously passed to the pressure chamber so that the pressure in the pressure chamber becomes the same as the pressure of the air pressure signal. At a predetermined time the valve is actuated to the second position and air is permitted to bleed until a predetermined pressure is reached in the pressure chamber, which actuates the switch turning on the thermal conditioning system.

10 Claims, 2 Drawing Figures

PNEUMATIC OPTIMIZER

BACKGROUND OF THE INVENTION

This invention relates to pneumatic control systems. In particular, it relates to pneumatic control systems used for starting a system for thermal conditioning of air in an enclosed space.

Many buildings such as office buildings, stores and factories are occupied or used only during predetermined hours and days of the week. Accordingly, in order to save energy and expenditures, the system for thermal conditioning of air inside the buildings (i.e. a cooling or a heating system) is rendered inoperative during the hours when the building is not occupied or used. The heating or the cooling system must however be restarted prior to the scheduled arrival of the occupants or users of the building, so that the temperature of the air inside the building is at a comfortable level by the time the users or occupants arrive. Since the amount of time needed to reach a comfortable temperature inside the building depends upon the temperature inside at the time the heating or cooling system is restarted, the re-start system is inefficient where the temperature differential between the desired temperature and the initial temperature is small. For example, the heating system might be programmed to be started at 6:00 A.M. during the winter in order to bring the temperature inside the enclosed space to a comfortable level by 9:00 A.M. When the temperature differential between the initial level and the comfortable level is small, the temperature inside the enclosed space will reach the desired level prior to 9:00 A.M. On the other hand, if the temperature differential is higher than expected, then the temperature of the enclosed space is still uncomfortable at the time the occupants or users of the building arrive. Similar problems arise when cooling of air in the enclosed space is required. Considerable energy savings may be realized if the heating or cooling system is started at the optimum time, thus enabling the enclosed space to reach a desired comfort level at time of occupancy. Accordingly, there is a need for a control system which delays or accelerates the restarting of the thermal conditioning system depending on the initial temperature of the enclosed space.

Several approaches have been proposed for developing a system that controls the restart time of the conditioning system. For example. U.S. Pat. Nos. 4,106,690; 3,317,692; 3,974,059; 4,040,565; 2,569,530; and 3,964,674 disclose such systems. The present invention provides an improved system for accomplishing the above-mentioned task.

The improved system of the present invention is a pneumatic system which is simple and inexpensive to construct and to maintain. The pneumatic control system of the present invention is also particularly suited for inclusion in already installed systems which are entirely pneumatic.

Thus, one object of the present invention is to provide a pneumatic system for controlling the starting time of the cooling or heating system depending on the initial sensed temperature.

Another object of the present invention is to provide a pneumatic system for controlling the starting time of a thermal conditioning system, which is relatively inexpensive, and simple and inexpensive to install and maintain.

Other objects of the present invention will become apparent to those skilled in the art upon studying this disclosure.

BRIEF DESCRIPTION OF THE INVENTION

A system for controlling the starting time of a thermal conditioning system includes a temperature transmitter, a pressure chamber, bleed means and a valve for selectively closing the communication between the pressure chamber and either but not both the temperature transmitter or bleed means.

The temperature transmitter senses the temperature of the enclosed space or the outside temperature and generates in response to the sensed temperature a pneumatic signal which is transmitted to a pressure chamber. At a predetermined time the valve is actuated to close the communication between the temperature transmitter and the pressure chamber and to open the communication between the pressure chamber and bleed means. The air from the pressure chamber is then gradually exhausted until the pressure in the pressure chamber is low enough to actuate a switch controlling the thermal conditioning system.

DETAILED DESCRIPTION OF THE INVENTION

The present invention provides a pneumatic system for controlling the start-up time of a thermal conditioning system depending on a sensed temperature. The thermal conditioning system can be a heating system or a cooling system. The sensed temperature can be the temperature of the air in the enclosed space, or the outside ambient air temperature. In many applications it may be desirable to sense both of the above-enumerated temperatures and select as an input to the pneumatic system the lower or the higher of these pressure signals. For example, when the temperature outside (at the time the control system of the present invention is activated) is 20° F. but the temperature inside the enclosed space is 50° F., it may be desirable to sense both temperatures and select the lower pressure signal as input to the pneumatic control system. Throughout this disclosure sensed temperature shall mean the temperature used by the temperature transmitter to generate a pneumatic signal.

Figure 1:
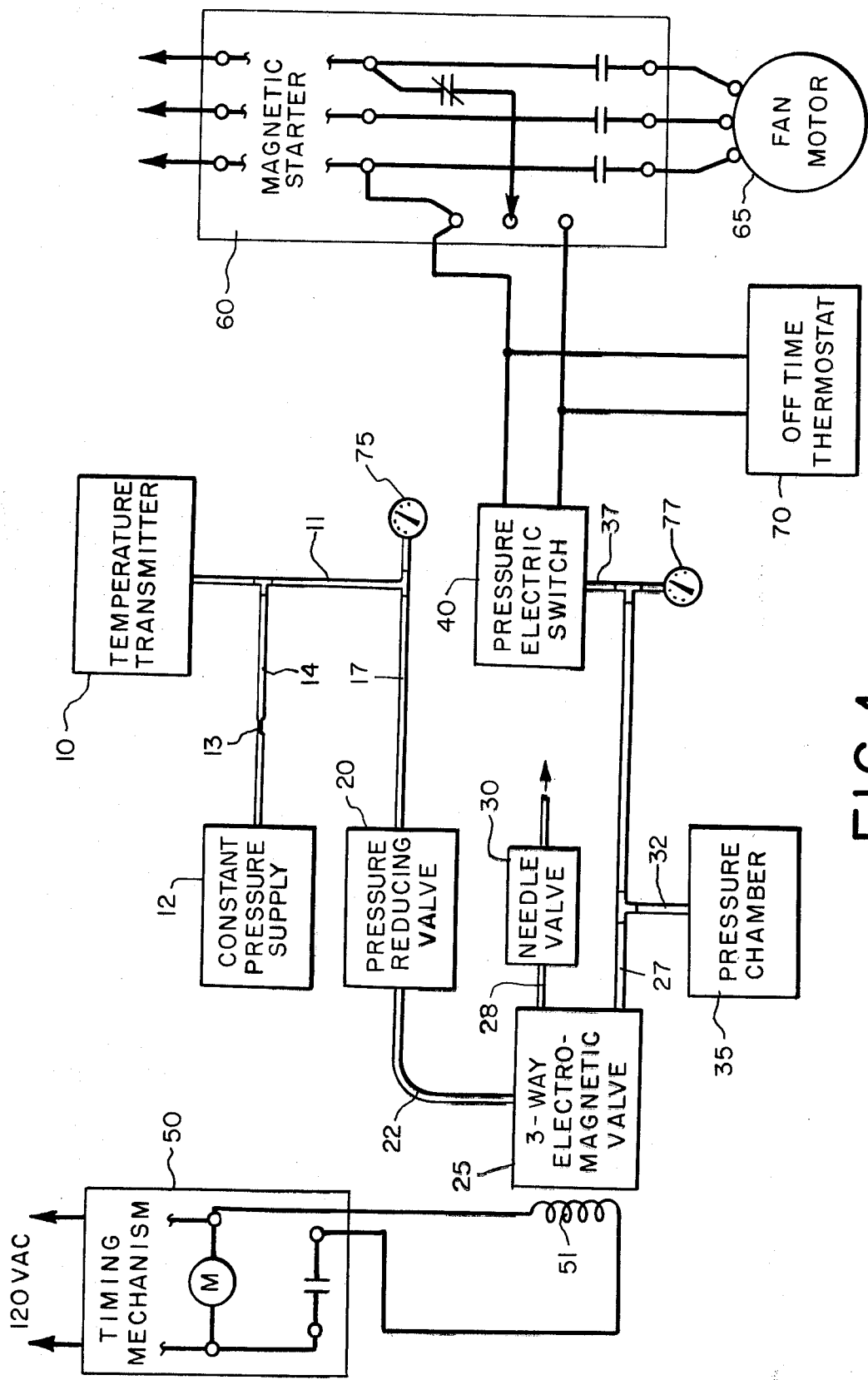
FIG. 1 is a schematic representation of a system constructed in accordance with the present invention utilizing a single temperature transmitter.

The embodiment of the invention shown in FIG. 1 will be used to further explain the present invention. Referring now to FIG. 1, the control system of the present invention includes a temperature transmitter 10 which senses the outdoor temperature and generates in response thereto a pressure signal indicative of the sensed temperature. The commercially available temperature transmitters generally produce an output pressure of about 3 to 15 psi depending on the sensed temperature. One temperature transmitter that can be used in the embodiment shown in the FIG. 1 is a commercially available model TT184 made and sold by MCC Powers Corporation at 3400 Oakton Street in Skokie, Ill. (hereinafter referred to as MCC Powers). The operation and construction of such temperature transmitters are well known in the art. For example, the detailed description of the operation and construction of the TT184 model can be found in MCC Powers' Instructional Bulletin TT184-1. The TT184 model transmitter for sensing outside ambient temperature is factory calibrated so that when the sensed temperature is −40°F., the transmitter generates a 3 psi pressure signal. When the sensed temperature is 120° F., the transmitter 10 generates a 15 psi pressure signal.

The transmitter 10 could also be designed to sense the temperature of the air in the enclosed space. The TT184 model for sensing the air in the enclosed space is factory calibrated so that when the sensed temperature is 50° F., the transmitter generates a 3 psi pressure signal. When the sensed temperature is 100° F. the transmitter generates a 15 psi pressure signal.

The transmitter generates the desired pressure by continuously controlling discharge of air from line 11. In the preferred embodiment the air is supplied to line 11 from a 22 psi constant pressure supply 12 through a restriction 13 in line 14. The pressure signal generated by the transmitter 10 is passed through a line 17 into a pressure reducing valve 20, which is set to transmit into a line 22 signals having the pressure at or below a certain predetermined level. If the pressure signal entering the pressure reducing valve 20 has a magnitude more than the predetermined level the pressure signal of the predetermined level is transmitted into line 22. If the pressure signal is less than the predetermined level then that signal is transmitted into the line 22. For example, in the system shown in FIG. 1, the pressure reducing valve 20 is set at 11.4 psi which corresponds to a sensed temperature of 72° F. When a signal having pressure above 11.4 is generated in that system, the 11.4 psi pressure signal is transmitted to the line 22.

Any pressure reducing valve can be used in the system. In the system depicted in FIG. 1 MCC Powers' valve RV201 is used. The operation and construction of that valve is described in the MCC Powers' Technical Bulletin 130.

The line 22 communicates with a valve 25. During the time the conditioning system is not operating or operating in an off-hours mode the valve 25 provides communication between line 22 and line 27 so that the pressure signal is transmitted from line 22 via line 32 to a pressure chamber 35. Since the temperature sensed by the temperature transmitter 10 changes slowly with time, the pressure in the pressure chamber 35 is substantially the same as that generated by the transmitter 10. The pressure in chamber 35 and in lines 32 and 27 is communicated via line 27 and line 37 to a pressure electric switch 40.

The valve 25 can be actuated to provide communication between line 27 and line 28 and to close line 22. When the valve 25 is in such position, the air from the pressure chamber 35 gradually passes through lines 27 and 28 and exhausts through bleed means such as a needle valve 30. Instead of the needle valve 30 the line 28 can be provided with a fixed restriction (not shown) to control the exhaust rate.

The choice of the type of valve 25 to be used in connection with a specific control system depends in part on the manner in which the valve is actuated. In the preferred embodiment the timing mechanism 50 actuates the valve 25 by means of an electromagnetic coil 51. Accordingly, an electromagentic valve is selected for the system. One such valve is MCC Power' valve model VE265. The operation and construction of that valve is described in the MCC Powers' Technical Bulletin 265-1.

The volume of the pressure chamber 35 varies depending on the particular system. The volume should be large enough such as to permit the desired range of time for the pressure to reach the level at which the conditioning system is actuated. For the system depicted in FIG. 1 the approximate volume of the pressure chamber 35 ranged from about 150 in$^3$ to about 25 in$^3$ depending on the specific components used in the system.

The pressure electric switch 40 controls the magnetic starter 60 of the fan motor 65. It should be pointed out that additional flexibility could be gained by having the pressure switch operate a relay (not shown) which can control additional devices besides the magnetic starter 60.

An off-time mode thermostat 70 controls the operation of the fan motor at times when the enclosed space is unoccupied or unused. Gages 75 and 77 show pressures in line 11 and 37 respectively. The gages used in the preferred embodiment are MCC Powers GA 142. Their construction and operation is described in MCC Powers Form GA 142-2. These gages are not necessary for the operation of the system.

In operation, the time mechanism 50 switches off the heating system at a predetermined time in anticipation of a building closing time, and simultaneously the timing mechanism 50 acts on coil 51 to actuate valve 25 to a position in which the line 22 communicates with line 27 and the line 28 is closed.

The pressure signal generated by the temperature transmitter 10 is then transmitted via line 17, the reducing valve 20, the line 22, the valve 25, the line 27 and the line 32 to the pressure chamber 35. As the temperature sensed by the transmitter 10 and the pressure signal generated in response thereto change, the pressure in the pressure chamber 35 changes accordingly.

At a predetermined time, the timing mechanism 50 activates the coil 51 which in turn moves the valve 25 into the position where the line 22 is closed and lines 27 and 28 are in communication. The air from the pressure chamber 35 then flows through the line 32, the line 27, the valve 25 and the line 28 into the needle valve 30 and gradually exhaust therefrom. As the pressure in the pressure chamber 35 decreases and reaches a predetermined level, the pressure in line 37 actuates the switch 40 which turns on the magnetic starter 60 of the fan motor 65.

Figure 2:
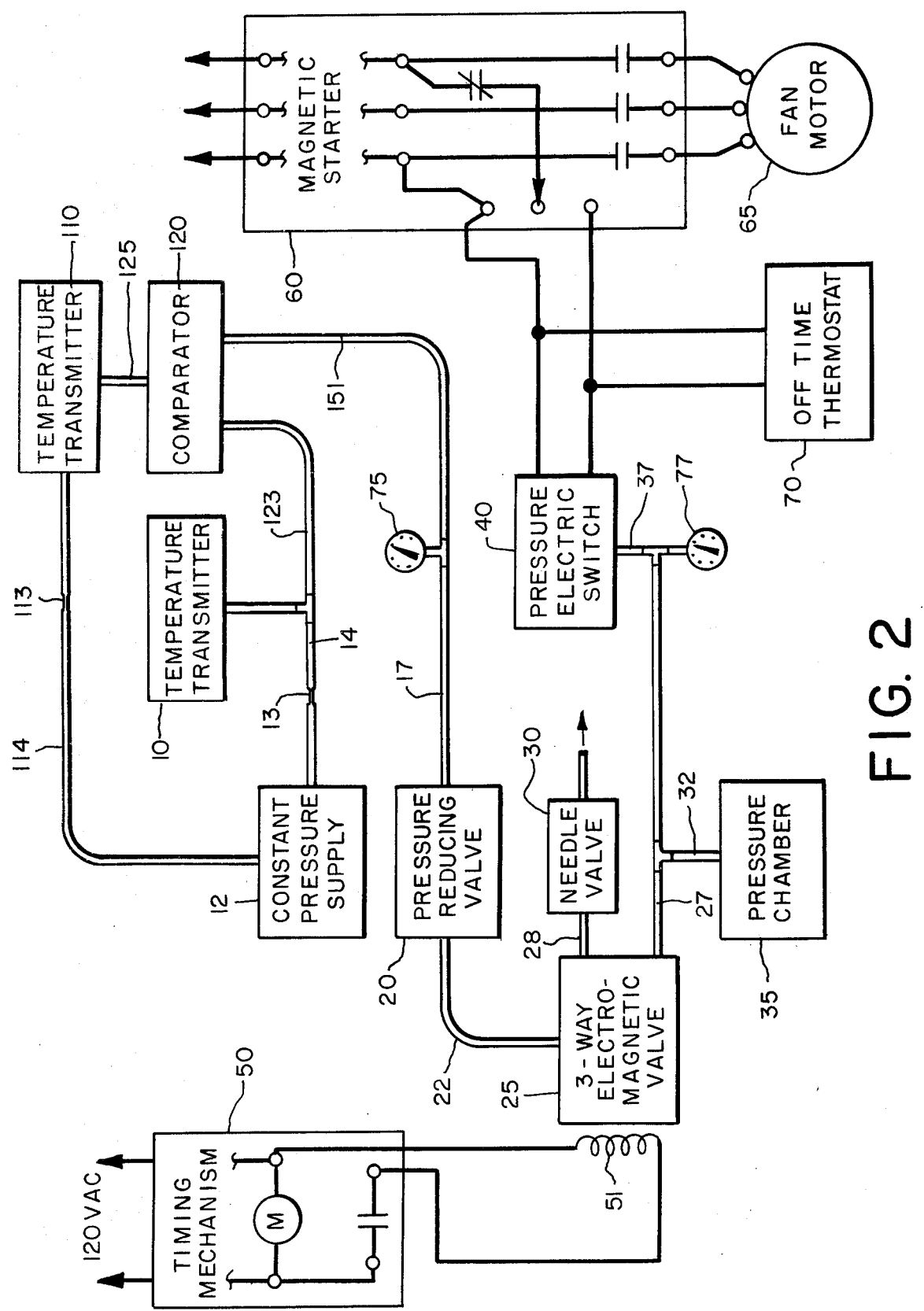
FIG. 2 is a schematic representation of a system constructed in accordance with the present invention utilizing two temperature transmitters.

Another embodiment of the present invention is depicted in FIG. 2. The system is the same as that depicted in FIG. 1 and discussed above except that an additional temperature transmitter 110 is employed and a pressure comparator 120 is used to select the lower or the higher of the pressure signals generated by the transmitters 10 and 110. The temperature transmitter 10 senses the ambient outdoor temperature and the temperature transmitter 110 senses the temperature of air in the enclosed space. The transmitter 110 is supplied with air from a constant pressure supply 12 through a restriction 113 via line 114. The pressure generated by the transmitter 10 and the transmitter 110 are passed to the pressure comparator 120 via lines 123 and 125, respectively. The comparator 120 selects the higher of the two pressure signals when the system is used in the cooling mode or selects the lower of the two signals when the system is used in the heating mode. The selected pressure signal is then transmitted to line 17 via line 151 and the system operates from this point in the same manner as that described in FIG. 1.

One type of a comparator that can be used in connection with this invention is RL 243 analog pressure relay made by MCC Powers.

The embodiment shown in FIG. 2 is especially useful for situations where the enclosed space has been in the off mode for an extended period of time.

It should be emphasized that the specific systems shown in FIGS. 1 and 2 are presented merely for illustrative purposes and is not intended to limit the scope of the invention defined in the claims. For example, the system of the present invention can be utilized in connection with either or both the heating system and the cooling system.

It should also be noted that several devices shown in the preferred embodiments depicted in the figures are not essential to the operation of the system. For example, gages 75 and 77 and the pressure reducing valve 20 are not essential in all operations although they may be preferred in some applications.

Many changes and modifications will become apparent to those skilled in the art upon studying this disclosure and the appended claims. All those changes and modifications that fall within the spirit of the invention defined by the claims are intended to be included within their scope.

What is claimed is:

1. A pneumatic system for controlling the start-up time of a thermal conditioning system for an enclosed space in response to a sensed temperature, which comprises:
   means for sensing a temperature and for generating in response thereto a pneumatic signal;
   a pressure chamber for receiving said pressure signal;
   bleed means;
   valve means having a first position for providing only a communication between said sensing and generating means and said pressure chamber and a second position providing only a communication between said pressure chamber and said bleed means; and
   means for transmitting the pressure of the pressure chamber to start said thermal conditioning system when said pressure drops to a predetermined level after said valve means is actuated into said second position.

2. A system as claimed in claim 1 wherein sensing and generating means comprises a pneumatic temperature transmitter.

3. A system as claimed in claim 1 wherein said sensing and generating means senses the temperature of the ambient outdoor air.

4. A system as claimed in claim 1 wherein said sensing and generating means senses the temperature of said enclosed space.

5. A system as claimed in claim 1 wherein sensing and generating means comprises a temperature transmitter, a constant pressure supply, and a line having a restriction providing air to said temperature transmitter.

6. A system as claimed in claim 1 further comprising a pressure reducing valve between said sensing and generating means and said valve means for limiting the maximum pressure transmitted to said chamber to those below a certain predetermined level.

7. A system as claimed in claim 1 further comprising a pressure reducing valve between said sensing and generating means and said valve means for limiting the minimum pressure transmitted to said chamber to those above a certain predetermined level.

8. A pneumatic system for controlling the start-up of a heating system for an enclosed space in response to a sensed temperature, which comprises:
   an outdoor temperature transmitter for sensing the outdoor ambient temperature of air and for generating in response thereto a first pneumatic signal;
   an outdoor temperature transmitter for sensing the temperature of air and for generating in response thereto a second pneumatic signal;
   comparator means for selecting the lower of said first signal and said second signal;
   a pressure chamber for receiving the pressure signal selected by said comparator means;
   bleed means;
   valve means having a first position providing only a communication between said sensing and generating means and said pressure chamber and a second position providing only a communication between said pressure chamber and said bleed means; and
   means for transmitting the pressure of the pressure chamber to start said heating system when said pressure drops to a predetermined level after said valve means is actuated into said second position.

9. A pneumatic system for controlling the start-up of a cooling system for an enclosed space in response to a sensed temperature, which comprises:
   an outdoor temperature transmitter for sensing the outdoor ambient temperature of air and for generating in response thereto a first pneumatic signal;
   an indoor temperature transmitter for sensing the temperature of air and for generating in response thereto a second pneumatic signal;
   comparator means for selecting the higher of said first signal and said second signal;
   a pressure chamber for receiving the pressure signal selected by said comparator means;
   bleed means;
   valve means having a first position providing only a communication between said sensing and generating means and said pressure chamber and a second position providing only a communication between said pressure chamber and said bleed means; and,
   means for transmitting the pressure of the pressure chamber to start said cooling system when said pressure drops to a predetermined level after said valve means is actuated into said second position.

10. A system for starting conditioning means for thermal conditioning of air for an enclosed space, said system comprising:
   timing means;
   actuating means responsive to said timing means;
   means for a sensing temperature and for generating in response thereto a pressure signal depending on the sensed temperature;
   a chamber for storing said pressure signal generated by said sensing and generating means;
   bleed means;
   valve means having a first position for providing only a communication between said sensing and generating means and said pressure chamber and a second position providing only a communication between said pressure chamber and said bleed means, said valve means being actuated at a predetermined time from the first to the second position and from the second to the first position by said actuating means;
   switch means for starting said conditioning means; and,
   means for transmitting the pressure from the pressure chamber to said switch means whenever the pressure drops to a predetermined level after said valve means is actuated into said second position.

* * * * *